(12) United States Patent
Amano

(10) Patent No.: US 7,062,628 B2
(45) Date of Patent: Jun. 13, 2006

(54) METHOD AND APPARATUS FOR STORAGE POOLING AND PROVISIONING FOR JOURNAL BASED STORAGE AND RECOVERY

(75) Inventor: Takashi Amano, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 15 days.

(21) Appl. No.: 10/950,945

(22) Filed: Sep. 28, 2004

(65) Prior Publication Data
US 2006/0069861 A1    Mar. 30, 2006

(51) Int. Cl.
*G06F 12/00*    (2006.01)

(52) U.S. Cl. .................. 711/170; 711/114; 711/100; 711/158; 711/172; 711/150; 711/151; 711/154; 711/156; 711/159; 711/162; 718/103; 718/104; 707/204; 713/1

(58) Field of Classification Search ............... None
See application file for complete search history.

(56) References Cited

U.S. PATENT DOCUMENTS

| | | | |
|---|---|---|---|
| 5,371,889 A | 12/1994 | Klein | |
| 6,301,677 B1 | 10/2001 | Squibb | |
| 6,463,501 B1 | 10/2002 | Kern et al. | |
| 2002/0099914 A1 | 7/2002 | Matsunami et al. | |
| 2003/0229754 A1 | 12/2003 | Micka et al. | |
| 2004/0111557 A1 | 6/2004 | Nakatani et al. | |
| 2005/0073887 A1 | 4/2005 | Hirakawa et al. | |

OTHER PUBLICATIONS

U.S. Appl. No. 10/608,391, filed Jun. 26, 2003, Yamagami.
U.S. Appl. No. 10/621,791, filed Jul. 7, 2003, Yamagami.

*Primary Examiner*—Mano Padmanabhan
*Assistant Examiner*—Mehdi Namazi
(74) *Attorney, Agent, or Firm*—Reed Smith LLP; Stanley P. Fisher, Esq.; Juan Carlos A. Marquez, Esq.

(57) ABSTRACT

A set of interconnected storage systems supporting different types of storage devices and different performance attributes are intelligently applied to process types, such as journal entries. The processes are ranked according to a predetermined priority ranking. Storage devices in the storage system having similar performance attributes are pooled and ranked according to their performance attributes. The highest priority process is matched with available logical devices from available storage pools that rank highest in the processes performance priority. A cache is similarly allocated from the highest ranking access speed logical devices.

32 Claims, 18 Drawing Sheets

Fig 1: system configuration

FIG. 3

| 401 | 402 | 403 | 404 | 405 | 406 |
|---|---|---|---|---|---|
| STORAGE SYSTEM ID | STORAGE SYSTEM NAME | VENDER NAME | PRODUCT NAME | SERIAL NUMBER | CASCADE |
| 0 | STORAGE 0 | VENDER_X | PRODUCT_A | 001 | 0 |
| 1 | STORAGE 1 | VENDER_Y | PRODUCT_B | 002 | 1 |
| 2 | STORAGE 2 | VENDER_Z | PRODUCT_C | 003 | 1 |

TABLE OF STORAGE SYSTEM CONFIGURATION

FIG. 4

| 401 | 502 | 503 | 504 | 505 | 506 | 507 | 508 | 509 | 510 | 511 | 512 |
|---|---|---|---|---|---|---|---|---|---|---|---|
| STORAGE SYSTEM ID | DEVICE ID | INTERFACE | VENDER NAME | MODEL NAME | BUFFER [MB] | ROTATIONAL SPEED [RPM] | CAPACITY [GB] | INTERNAL DATA TRANSFER RATE [Mbps] | AVERAGE OF SEEK TIME [ms] | NUMBER OF DISKS | TOTAL CAPACITY [GB] |
| 0 | 0-0 | ULTRA320 SCSI | VENDER_A | MODEL_A | 8 | 12000 | 100 | 800 | 2.0 | 4 | 400 |
| 1 | 1-0 | SATA 1500 | VENDER_B | MODEL_B | 8 | 10000 | 600 | 500 | 3.0 | 24 | 14400 |
| 2 | 2-0 | ULTRA320 SCSI | VENDER_C | MODEL_C | 8 | 10000 | 200 | 800 | 3.0 | 16 | 3200 |
| 2 | 2-1 | SATA/1500 | VENDER_D | MODEL_D | 4 | 10000 | 300 | 600 | 4.0 | 8 | 2400 |

TABLE OF DISK INFORMATION

| raid group | number of physical disk | number of LDEV | used space [GB] | raid level | free space [GB] | device ID |
|---|---|---|---|---|---|---|
| 1-1 | 4 | 4 | 0 | 1 | 400 | 0-0 |
| 2-1 | 8 | 5 | 0 | 5 | 4800 | 1-0 |
| 2-2 | 8 | 5 | 0 | 5 | 4800 | 1-0 |
| 2-3 | 8 | 5 | 0 | 5 | 4800 | 1-0 |
| 3-1 | 8 | 5 | 0 | 5 | 2500 | 2-0 |
| 3-2 | 8 | 2 | 0 | 1 | 700 | 2-0 |
| 3-3 | 8 | 4 | 0 | 5 | 2400 | 2-1 |

Fig 5: configuration of raid group

| POOL ID 801 | LDEV ID 701 | RAID GROUP 601 | CAPACITY [GB] 702 | PORT 703 | IN USE 704 | USED SPACE [GB] 705 | DEVICE ID 502 |
|---|---|---|---|---|---|---|---|
| 0 | 00:00 | 1-1 | 100 | - | NO | 0 | 0-0 |
| 0 | 00:01 | 1-1 | 100 | - | NO | 0 | 0-0 |
| 0 | 00:02 | 1-1 | 100 | - | NO | 0 | 0-0 |
| 0 | 00:03 | 1-1 | 100 | - | NO | 0 | 0-0 |
| 1 | 01:00 | 2-1 | 960 | - | NO | 0 | 1-0 |
| 1 | 01:01 | 2-1 | 960 | - | NO | 0 | 1-0 |
| 1 | 01:02 | 2-1 | 960 | - | NO | 0 | 1-0 |
| 1 | 01:03 | 2-1 | 960 | - | NO | 0 | 1-0 |
| 1 | 01:04 | 2-1 | 960 | - | NO | 0 | 1-0 |
| 1 | 01:05 | 2-2 | 960 | - | NO | 0 | 1-0 |
| 1 | 01:06 | 2-2 | 960 | - | NO | 0 | 1-0 |
| 1 | 01:07 | 2-2 | 960 | - | NO | 0 | 1-0 |
| 1 | 01:08 | 2-2 | 960 | - | NO | 0 | 1-0 |
| 1 | 01:09 | 2-2 | 960 | - | NO | 0 | 1-0 |
| 1 | 01:10 | 2-3 | 960 | - | NO | 0 | 1-0 |
| 1 | 01:11 | 2-3 | 960 | - | NO | 0 | 1-0 |
| 1 | 01:12 | 2-3 | 960 | - | NO | 0 | 1-0 |
| 1 | 01:13 | 2-3 | 960 | - | NO | 0 | 1-0 |
| 1 | 01:14 | 2-3 | 960 | - | NO | 0 | 1-0 |
| 2 | 02:00 | 3-1 | 500 | - | NO | 0 | 2-0 |
| 2 | 02:01 | 3-1 | 500 | - | NO | 0 | 2-0 |
| 2 | 02:02 | 3-1 | 500 | - | NO | 0 | 2-0 |
| 2 | 02:03 | 3-1 | 500 | - | NO | 0 | 2-0 |
| 2 | 02:04 | 3-1 | 500 | - | NO | 0 | 2-0 |
| 2 | 02:05 | 3-2 | 350 | - | NO | 0 | 2-0 |
| 2 | 02:06 | 3-2 | 350 | - | NO | 0 | 2-0 |
| 3 | 03:00 | 3-3 | 400 | - | NO | 0 | 2-1 |
| 3 | 03:01 | 3-3 | 400 | - | NO | 0 | 2-1 |
| 3 | 03:02 | 3-3 | 400 | - | NO | 0 | 2-1 |
| 3 | 03:03 | 3-3 | 400 | - | NO | 0 | 2-1 |

CONFIGURATION OF LDEV

*FIG. 6*

| 801 | 502 | 802 | 803 | 804 | 805 | 806 |
|---|---|---|---|---|---|---|
| pool ID | device ID | capacity rank | reliability rank | access rate rank | writable | enable |
| 0 | 0-0 | 4 | 1 | 1 | 1 | 1 |
| 1 | 1-0 | 1 | 2 | 3 | 1 | 1 |
| 2 | 2-0 | 2 | 1 | 2 | 1 | 1 |
| 3 | 2-1 | 3 | 2 | 4 | 1 | 1 |

Fig 7: rank of storage pool's element

| 901 | 902 | 903 | 904 | 905 | 906 |
|---|---|---|---|---|---|
| journal type ID | journal name | priority | capacity | reliability | access rate |
| 0 | normal after journal | 2 | very high | moderate | moderate |
| 1 | before journal | 1 | low | high | very high |
| 2 | mirrored after journal | 3 | very high | low | low |

Fig 8: journal information

| JOURNAL GROUP ID 1001 | JOURNAL TYPE ID 901 | AUTOMATIC INCREASED CAPACITY MODE 1002 | CAPACITY OF INCREASED CAPACITY [GB] 1003 | THRESHOLD FOR AUTOMATIC INCREAED CAPACITY 1004 | LDEV ID 701 | PORT 703 | CAPACITY (GB) 702 | POOL ID 801 |
|---|---|---|---|---|---|---|---|---|
| 0 | 0 | ON | 960 | REMAINING CAPACITY 800GB | - | - | - | - |
|   | 1 | OFF | - | - | - | - | - | - |
|   | 2 | ON | 960 | 70% IN USE | - | - | - | - |
|   | - | - | - | - | - | - | - | - |
| - |   |   |   |   |   |   |   |   |

CORRESPONDING TABLE BETWEEN JOURNAL GROUP ID AND JOURNAL TYPE ID

*FIG. 9*

| JOURNAL TYPE ID | ORDER OF POOL ID |
|---|---|
| 0 | 1, 2, 3, 0 |
| 1 | 0, 2, 3, 1 |
| 2 | 1, 2, 3, 0 |

CORRESPONDING TABLE BETWEEN JOURNAL TYPE ID AND ORDER OF POOL ID

*FIG. 10*

| rank | interface | data transfer rate [MB/s] |
| --- | --- | --- |
| 1 | SAS v1 | 375 |
| 2 | Ultra320 SCSI | 320 |
| 3 | Ultra160 SCSI | 160 |
| 4 | Serial ATA/6000 | 750 |
| 5 | Serial ATA/3000 | 375 |
| 6 | Serial ATA/1500 | 188 |
| 7 | Ultra ATA/133 | 133 |

Fig 11: rank of interface

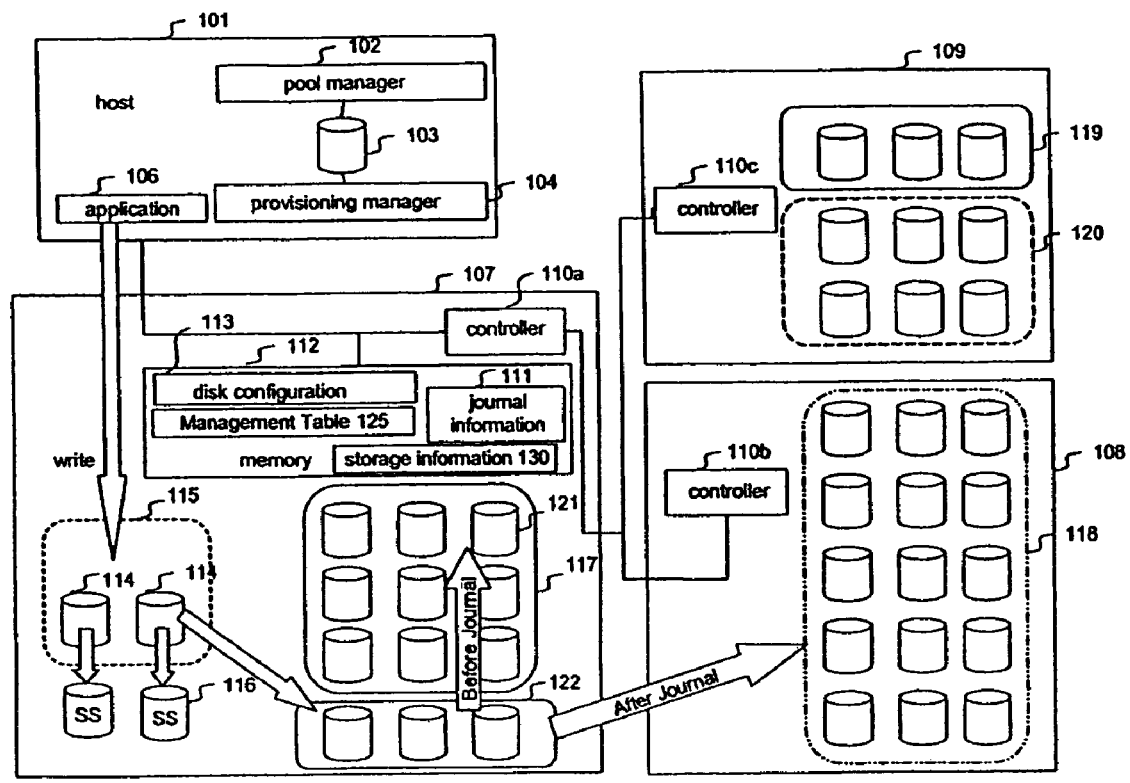
Fig. 12: storage pool for cache in storage systems

LDEV ASSIGNMENT FOR JOURNAL GROUP

| JOURNAL GROUP ID | JOURNAL TYPE ID | AUTOMATIC INCREASED CAPACITY MODE | CAPACITY OF INCREASED CAPACITY [GB] | THRESHOLD FOR AUTOMATIC INCREAED CAPACITY | LDEV ID | PORT | CAPACITY | POOL ID |
|---|---|---|---|---|---|---|---|---|
| 0 | 0 | ON | 960 | REMAINING CAPACITY 800GB | 01:00 | CL-1A | 960 | 1 |
| | | | | | 01:01 | CL-1A | 960 | 1 |
| | | | | | 01:02 | CL-1A | 960 | 1 |
| | 1 | OFF | - | - | 01:03 | CL-1A | 960 | 0 |
| | | | | | 00:00 | CL-1A | 100 | 0 |
| | 2 | ON | 960 | 70% IN USE | 01:01 | CL-1A | 100 | 1 |
| | | | | | 01:04 | CL-1A | 960 | 1 |
| | | | | | 01:05 | CL-1A | 960 | 1 |
| | | | | | 01:06 | CL-1A | 960 | 1 |
| - | 0 | - | - | - | - | - | - | - |
| | 1 | - | - | - | - | - | - | - |
| | 2 | - | - | - | - | - | - | - |

CORRESPONDING TABLE BETWEEN JOURNAL GROUP ID AND JOURNAL TYPE ID AFTER MAPPING OF JOURNAL TYPE AND LDEV

FIG. 15

| POOL ID ⌐801 | LDEV ID ⌐701 | RAID GROUP ⌐601 | CAPACITY [GB] ⌐702 | PORT ⌐703 | IN USE ⌐704 | USED SPACE [GB] ⌐705 | DEVICE ID ⌐502 |
|---|---|---|---|---|---|---|---|
| 0 | 00:00 | 1-1 | 100 | CL1-A | YES | 0 | 0-0 |
| 0 | 00:01 | 1-1 | 100 | CL1-A | YES | 0 | 0-0 |
| 0 | 00:02 | 1-1 | 100 | - | NO | 0 | 0-0 |
| 0 | 00:03 | 1-1 | 100 | - | NO | 0 | 0-0 |
| 1 | 01:00 | 2-1 | 960 | CL1-A | YES | 0 | 1-0 |
| 1 | 01:01 | 2-1 | 960 | CL1-A | YES | 0 | 1-0 |
| 1 | 01:02 | 2-1 | 960 | CL1-A | YES | 0 | 1-0 |
| 1 | 01:03 | 2-1 | 960 | CL1-A | YES | 0 | 1-0 |
| 1 | 01:04 | 2-1 | 960 | CL1-A | YES | 0 | 1-0 |
| 1 | 01:05 | 2-2 | 960 | CL1-A | YES | 0 | 1-0 |
| 1 | 01:06 | 2-2 | 960 | CL1-A | YES | 0 | 1-0 |
| 1 | 01:07 | 2-2 | 960 | - | NO | 0 | 1-0 |
| 1 | 01:08 | 2-2 | 960 | - | NO | 0 | 1-0 |
| 1 | 01:09 | 2-2 | 960 | - | NO | 0 | 1-0 |
| 1 | 01:10 | 2-3 | 960 | - | NO | 0 | 1-0 |
| 1 | 01:11 | 2-3 | 960 | - | NO | 0 | 1-0 |
| 1 | 01:12 | 2-3 | 960 | - | NO | 0 | 1-0 |
| 1 | 01:13 | 2-3 | 960 | - | NO | 0 | 1-0 |
| 1 | 01:14 | 2-3 | 960 | - | NO | 0 | 1-0 |
| 2 | 02:00 | 3-1 | 500 | - | NO | 0 | 2-0 |
| 2 | 02:01 | 3-1 | 500 | - | NO | 0 | 2-0 |
| 2 | 02:02 | 3-1 | 500 | - | NO | 0 | 2-0 |
| 2 | 02:03 | 3-1 | 500 | - | NO | 0 | 2-0 |
| 2 | 02:04 | 3-1 | 500 | - | NO | 0 | 2-0 |
| 2 | 02:05 | 3-2 | 350 | - | NO | 0 | 2-0 |
| 2 | 02:06 | 3-2 | 350 | - | NO | 0 | 2-0 |
| 3 | 03:00 | 3-3 | 400 | - | NO | 0 | 2-1 |
| 3 | 03:01 | 3-3 | 400 | - | NO | 0 | 2-1 |
| 3 | 03:02 | 3-3 | 400 | - | NO | 0 | 2-1 |
| 3 | 03:03 | 3-3 | 400 | - | NO | 0 | 2-1 |

CONFIGURATION OF LDEV AFTER MAPPING OF JOURNAL TYPE ID AND LDEV

*FIG. 16*

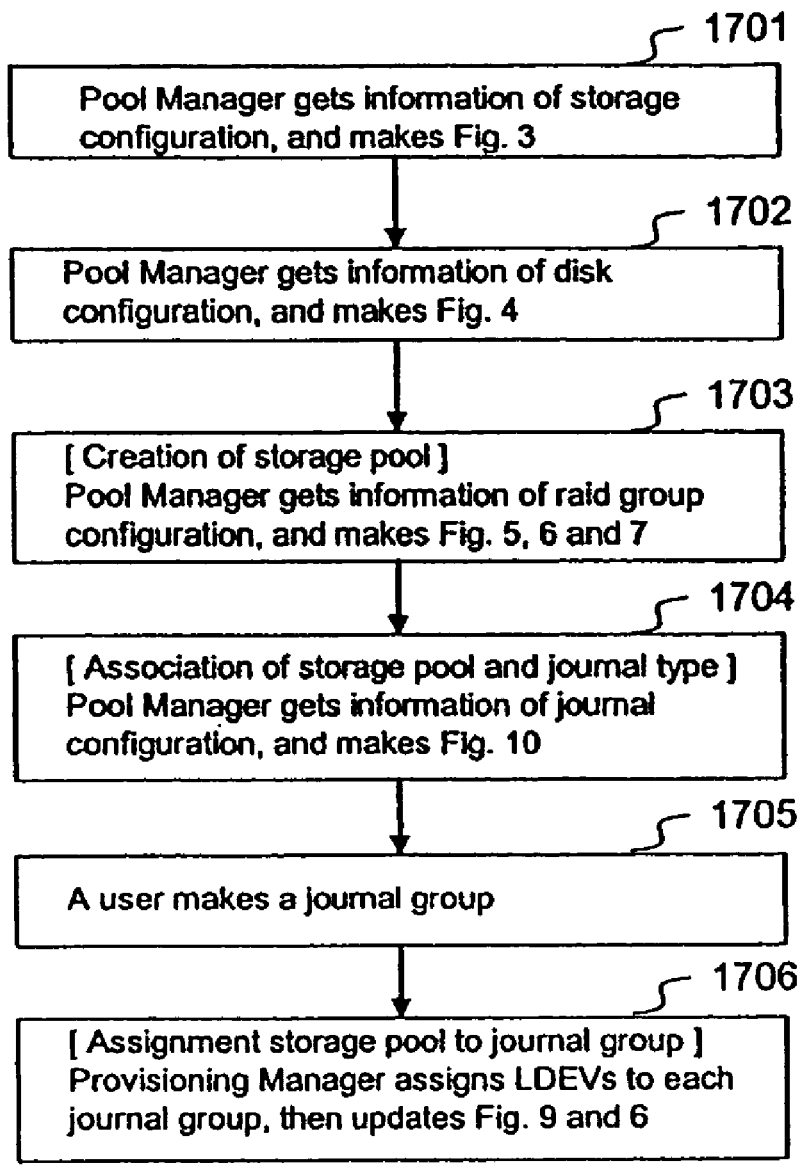
Fig 17: overview of assignment storage pool to journal group

| cache pool ID (1801) | threshold for destaging timing (1802) | LDEV ID (701) | Port (703) | Capacity (GB) (702) | pool ID (801) |
|---|---|---|---|---|---|
| 0 | 80GB in use | - | - | - | - |
|  |  | - | - | - | - |
|  |  | - | - | - | - |
|  |  | - | - | - | - |

Fig 18: table of cache pool

| cache pool ID (1801) | threshold for destaging timing (1802) | LDEV ID (701) | Port (703) | Capacity (GB) (702) | pool ID (801) |
|---|---|---|---|---|---|
| 0 | 80GB in use | 00:02 | CL1-B | 100 | 0 |
|  |  | - | - | - | - |
|  |  | - | - | - | - |
|  |  | - | - | - | - |

Fig 19: table of cache pool after Fig 13

| POOL ID (801) | LDEV ID (701) | RAID GROUP (601) | CAPACITY [GB] (702) | PORT (703) | IN USE (704) | USED SPACE [GB] (705) | DEVICE ID (502) |
|---|---|---|---|---|---|---|---|
| 0 | 00:00 | 1-1 | 100 | CL1-A | YES | 0 | 0-0 |
| 0 | 00:01 | 1-1 | 100 | CL1-A | YES | 0 | 0-0 |
| 0 | 00:02 | 1-1 | 100 | CL1-B | YES | 0 | 0-0 |
| 0 | 00:03 | 1-1 | 100 | - | NO | 0 | 0-0 |
| 1 | 01:00 | 2-1 | 960 | CL1-A | YES | 0 | 1-0 |
| 1 | 01:01 | 2-1 | 960 | CL1-A | YES | 0 | 1-0 |
| 1 | 01:02 | 2-1 | 960 | CL1-A | YES | 0 | 1-0 |
| 1 | 01:03 | 2-1 | 960 | CL1-A | YES | 0 | 1-0 |
| 1 | 01:04 | 2-1 | 960 | CL1-A | YES | 0 | 1-0 |
| 1 | 01:05 | 2-2 | 960 | CL1-A | YES | 0 | 1-0 |
| 1 | 01:06 | 2-2 | 960 | CL1-A | YES | 0 | 1-0 |
| 1 | 01:07 | 2-2 | 960 | - | NO | 0 | 1-0 |
| 1 | 01:08 | 2-2 | 960 | - | NO | 0 | 1-0 |
| 1 | 01:09 | 2-2 | 960 | - | NO | 0 | 1-0 |
| 1 | 01:10 | 2-3 | 960 | - | NO | 0 | 1-0 |
| 1 | 01:11 | 2-3 | 960 | - | NO | 0 | 1-0 |
| 1 | 01:12 | 2-3 | 960 | - | NO | 0 | 1-0 |
| 1 | 01:13 | 2-3 | 960 | - | NO | 0 | 1-0 |
| 1 | 01:14 | 2-3 | 960 | - | NO | 0 | 1-0 |
| 2 | 02:00 | 3-1 | 500 | - | NO | 0 | 2-0 |
| 2 | 02:01 | 3-1 | 500 | - | NO | 0 | 2-0 |
| 2 | 02:02 | 3-1 | 500 | - | NO | 0 | 2-0 |
| 2 | 02:03 | 3-1 | 500 | - | NO | 0 | 2-0 |
| 2 | 02:04 | 3-1 | 500 | - | NO | 0 | 2-0 |
| 2 | 02:05 | 3-2 | 350 | - | NO | 0 | 2-0 |
| 2 | 02:06 | 3-2 | 350 | - | NO | 0 | 2-0 |
| 3 | 03:00 | 3-3 | 400 | - | NO | 0 | 2-1 |
| 3 | 03:01 | 3-3 | 400 | - | NO | 0 | 2-1 |
| 3 | 03:02 | 3-3 | 400 | - | NO | 0 | 2-1 |
| 3 | 03:03 | 3-3 | 400 | - | NO | 0 | 2-1 |

CONFIGURATION OF LDEV AFTER FIG. 13

FIG. 20

METHOD AND APPARATUS FOR STORAGE POOLING AND PROVISIONING FOR JOURNAL BASED STORAGE AND RECOVERY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to storage pooling, and more particularly to management of provisioning and storage pooling for journal based backup, recovery, and remote copy of data. The present invention is yet more particularly related to management of storage pooling in storage systems having storage devices of varying performance attributes and the allocation of the storage pools to journals having varying performance priorities.

2. Discussion of Background

Data is increasingly being stored in large scale storage systems with multiple physical and logical devices. Backing up stored data is of primary importance to all vendors of data storage and particularly to data users.

Several methods are conveniently used to prevent data loss. Typically, data is backed up in a periodic manner (e.g., once per day) by a system administrator. Many systems are commercially available which provide backup and recovery of data (e.g., Veritas, NetBackup, Legato/Networker, and so on). Another technique is known as volume shadowing. This technique produces a mirror image of data onto a secondary storage system as it is being written tot he primary storage system.

Journaling is a backup and restore technique commonly used in database systems. An image of the data to be backed up is taken. Then, as changes are made to the data, a journal of changes is maintained. Recovery of data is accomplished by applying the journal to an appropriate image to recover data at any point in time. Typical database systems, such as Oracle, can perform journaling.

SUMMARY OF THE INVENTION

The present inventor has realized that increased storage capacity at lower cost in a storage system is possible by adding a less inexpensive storage system (such as an ATA array system and/or a predecessor model of storage system). However, the present inventor has also realized that, in the situation where various types of storage systems are interconnected to each other, since there are differences in reliability and performance between the storage systems (and possibly between devices within the storage system), it is preferable, and may be required, to store certain data in a specific storage system. In fact, in some cases storing data in an incorrect or less preferred of the available storage systems can degrade performance of the entire interconnected system.

The present invention provides a storage system that includes a mechanism by which storage space is allocated within the storage system. In one embodiment, the storage space is allocated based on performance priorities of data to be stored in the allocated space. In one embodiment, the storage space is allocated for journal volume(s), which are, for example, journal data of updates to one or more data volumes. The data volumes store data received from a host computer and the journal data is stored in journal volumes different from the data volumes. The storage space is allocated based on performance priorities of the type of journal data to be stored in the allocated space. In one embodiment, the present invention also provides capability to select proper volumes for the journal volumes in the appropriate storage pool so that the journal volumes can be efficiently accessed.

The storage system of the present invention also identifies and manages one or more storage pools comprising the same kind of storage device (e.g., disk drives). The storage system itself may be composed of multiple different kinds of storage devices.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a table of storage system configuration information to an embodiment of the present invention;

FIG. 4 is a table maintaining information about physical disks used in a storage system according to an embodiment of the present invention;

FIG. 5 is a table of RAID group configuration information according to an embodiment of the present invention;

FIG. 6 is a table of logical device configuration information according to an embodiment of the present invention;

FIG. 7 is a table of a rank of storage pool elements according to an embodiment of the present invention;

FIG. 8 is a table of journal information according to an embodiment of the present invention;

FIG. 9 is a table of journal group per journal table according to an embodiment of the present invention;

FIG. 10 is a table of pool ID's for selected journal type ID according to an embodiment of the present invention;

FIG. 11 is a table of interface rank according to an embodiment of the present invention;

FIG. 12 is a block diagram of a host, storage systems, and cache according to an embodiment of the present invention;

FIG. 15 is a table of mapped journal type ID and journal ID types according to an embodiment of the present invention;

FIG. 16 is an LDEV configuration table after Journal ID type and LDEV mapping according to an embodiment of the present invention;

FIG. 17 is a flow chart that illustrates an overview of a method for assignment of storage pool resources to a journal group according to an embodiment of the present invention;

FIG. 18 is a table of a cache pool according to an embodiment of the present invention;

FIG. 19 is a table of a cache pool after allocation of LDEVs tot he cache pool according to an embodiment of the present invention;

FIG. 20 is a table of illustrating LDEV configuration after allocation of a cache pool according to an embodiment of the present invention.

DESCRIPTION OF THE PREFERRED EMBODIMENTS

Figure 1:
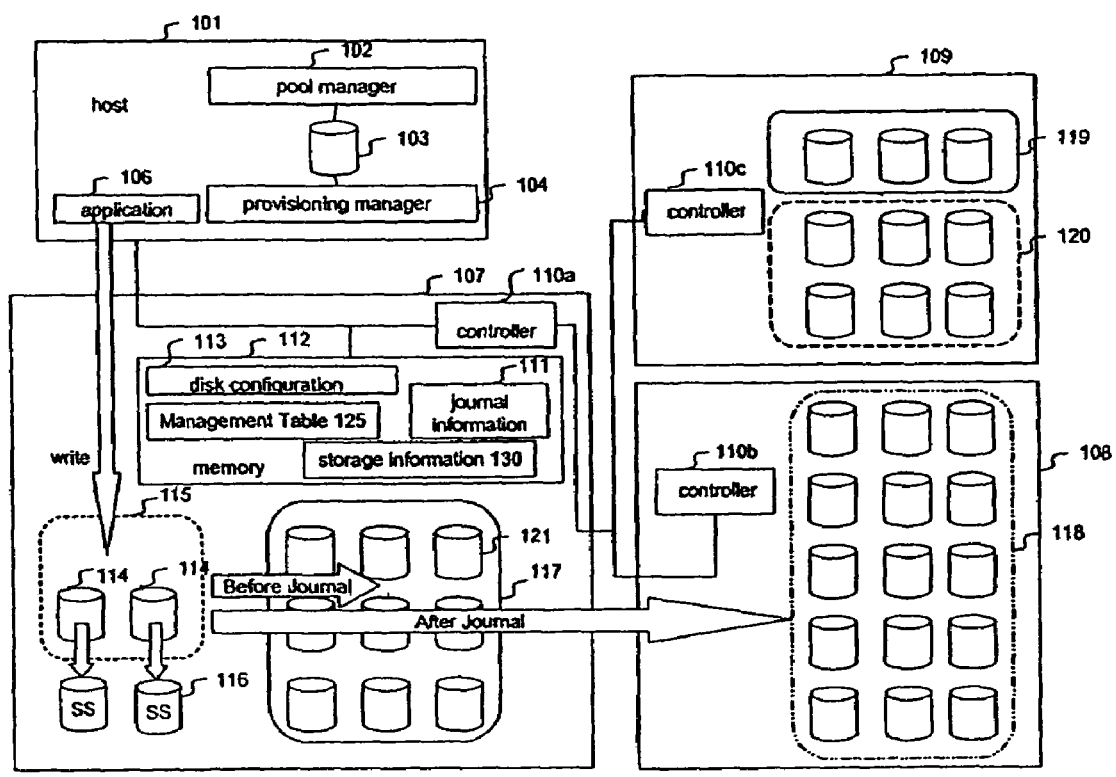
FIG. 1 is a block diagram of data processing system including a host, a primary storage system, and secondary systems configured according to an embodiment of the present invention.

Referring now to the drawings, wherein like reference numerals designate identical or corresponding parts, and more particularly to FIG. 1 thereof, there is illustrated a block diagram of data processing system including host 101, at least one application software 106, storage system 107 coupled to host 101, and external storage systems 108 and 109 coupled to storage system 107.

Storage system 107 has data volumes 114 storing data that host 101 reads from/writes to. Application storage system 107 is referred to as a primary storage system. Primary storage system 107 has, for example, several types of storage systems. The several types of storage systems are, for example, disk drives, such as SCSI disks, ATA disks, or other disks. The primary storage system 107 and external storage systems 108 and 109 together comprise an interconnected storage system. External storage systems 108 and 109 are, for example, secondary storage systems.

In this embodiment, host 101 is configured to run pool manger 102 and provisioning manger 104. Pool manager 102 is configured to discover storage resources in primary storage system 107 and storage systems 108 and 109, and to create a storage pool for each type of storage device (e.g., each type of disk drive). The resource discovery may be done automatically or manually. Provisioning manager 104 is configured to assign storage resources of the storage pools for one or more journal volumes based on journal information. The journal information is, for example, stored in primary storage system 107, and an example detail of the journal information is shown in FIG. 8.

Alternatively, pool manger 102 and provisioning manger 104 may run on a sever other than host 101 or primary storage system 107, or may comprise a set of specifically designed circuits configured to operate independent of a host device. Also, the pool and provisioning managers may be hosted in different places.

In one embodiment, host 101 includes a management database 103. An example structure of the management database is shown in FIGS. 3 to 11 and 18. Alternatively, the information of the management database may be stored in memory 112 or another location. Storage information 130 is information about a storage system (e.g., primary or secondaries) that may, for example, be provided by a storage vender. Storage information 130 includes, for example, serial number, vender name, storage system name, product name, etc.

Primary storage system 107 includes controller 110a, journal information 111, memory 112, a journal group 115, snapshots 116, storage pool 117 and management table 125.

Controller 110a manages physical disks and logical devices in the primary storage system 107. Journal group 115 is a set of data volumes 114. Whenever data in any data volume 114 in the journal group 115 is updated, the updates are recorded as journal data in chronological order in the journal group 115. In one embodiment, primary storage system 107 is configured to have a plurality of journal groups therein.

Each snapshot 116 is a point in time copy of a data volume 114. Storage pool 117 includes logical devices 121. Storage pool 117 is made up with physical disks with the same performance attributes.

Controller 110a is configured to collect physical disk information from the primary storage system 107 and in external storage systems 108 and 109. The physical disk information is collected, for example, by using "Identify Device" commands for ATA disks and "Inquiry" commands for SCSI disks. The collected disk information is stored, for example, in disk configuration 113 in memory 112. Logical device information may also be stored in disk configuration 113.

An example detail of the disk configuration 113 is shown in FIGS. 3–6. Journal information 111 is information about a journal function that primary storage system 107 provides. Journal information 111 may be set by a storage vendor or by a user through provisioning manager 102 (e.g. via a GUI). Management table 125 is information used to manage the journal data.

Storage system 108 includes storage controller 110b and storage pool 118. Controller 110b manages physical disks and logical devices in the storage system 108. Storage system 109 includes storage controller 110c and storage pools 119 and 120. Controller 10c manages physical disks and logical devices in the storage system 109.

FIG. 17 illustrates an overview of an embodiment of a method for assignment of storage pool resources to a journal group.

Step 1701: The Pool Manager 102 retrieves information of storage system configurations, and makes FIG. 3. See FIG. 3.

Step 1702: The Pool Manager 102 retrieves information of disk configurations, and makes FIG. 4. See FIG. 4.

Step 1703: The Pool Manager 102 retrieves information of raid group configurations, and makes FIGS. 5, 6 and 7. See FIGS. 5, 6 and 7.

Step 1704: The Pool Manager 102 retrieves information of journal configurations, and makes FIG. 10. See FIG. 10.

Step 1705: A user makes a journal group by using Provisioning Manager 104.

Figure 14:
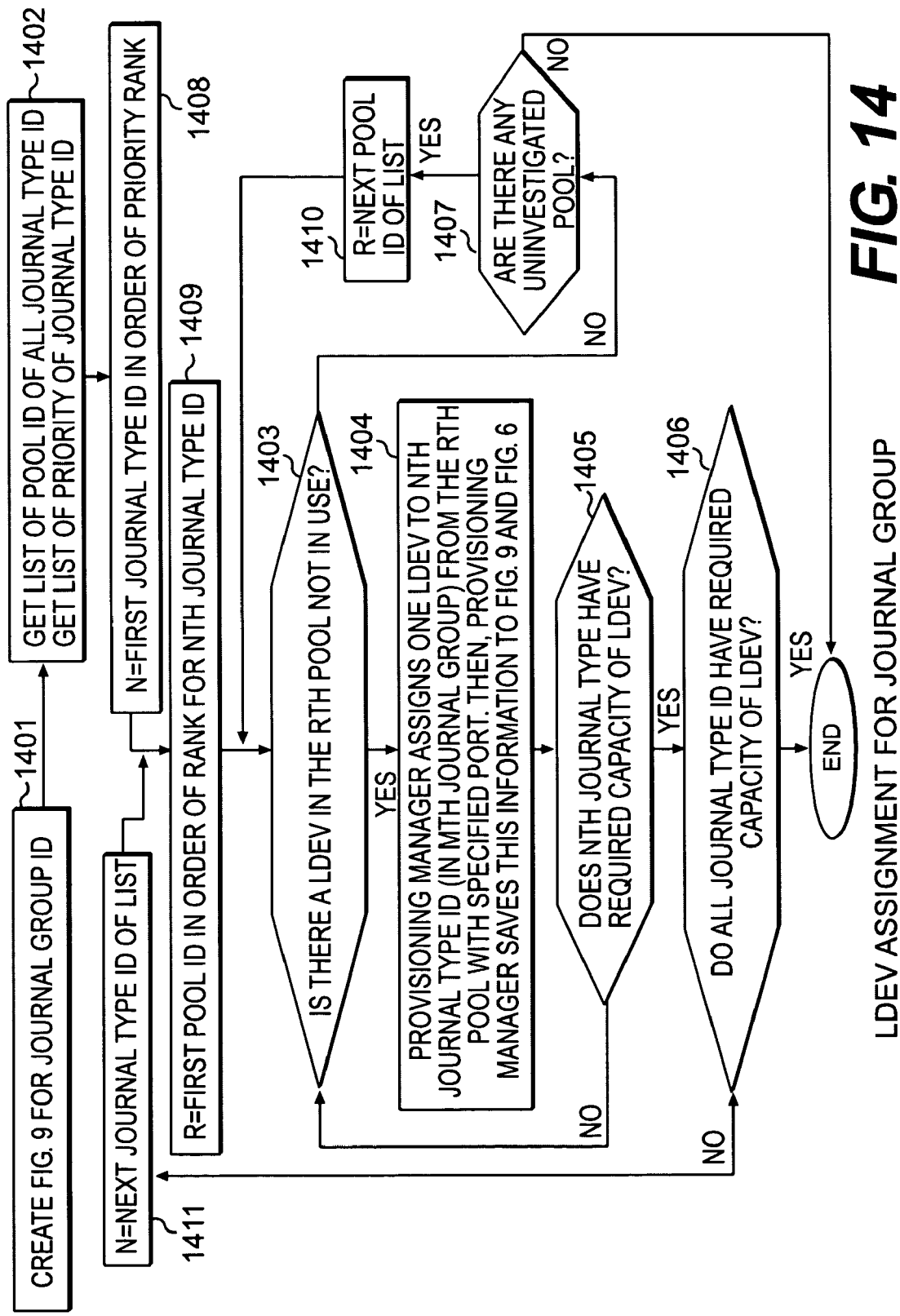
FIG. 14 is a flow chart of a process of LDEV assignment to a journal type according to an embodiment of the present invention.

Step 1706: Provisioning Manager assigns LDEVs to each journal group. Then updates FIGS. 9 and 6. An example method for assigning LDEVs is illustrated in FIG. 14.

Figure 2:
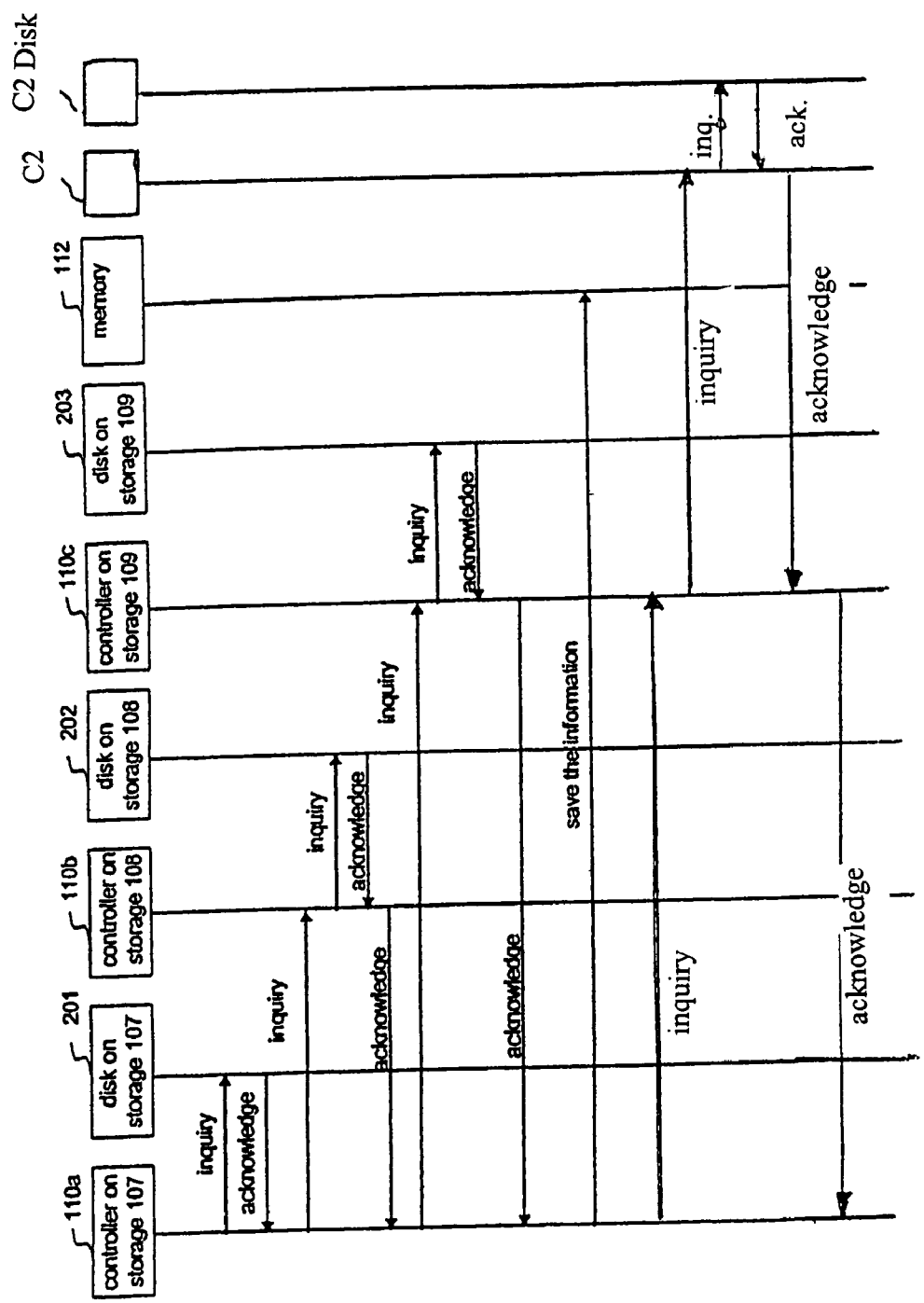
FIG. 2 is a sequence diagram of determining physical disk information according to an embodiment of the present invention.

FIG. 2 shows a sequence diagram for collecting physical disk information. As mentioned above, controller 110a may collect physical disk information in primary storage system 107 using "Identify Device" commands for ATA disks and "Inquiry" commands for SCSI disks. Other appropriate commands may be utilized for other storage devices.

The primary storage system 107 has an interface to communicate with one or more external storage systems. The external storage systems are identified by a port number or a serial number.

Controller 110a sends inquiry commands to controller 10b and 110c to obtain information regarding storage devices in storage systems 108 and 109. The inquiry commands, for example, direct controller 110b to collect physical disk information in the storage system 108 using, for example, "Identify Device" commands for ATA disks and "Inquiry" commands for SCSI disks in accordance with the inquiry command and send the information to controller 110a. Controller 110c sends physical disk (or other storage information) in the storage system 109 to storage controller 110a in the same way.

The detail of disk configuration 113 is shown in FIGS. 3–6. Disk configuration 113 includes information collected by controller 110a.

FIG. 3 shows a table of storage system configuration. Storage system ID 401 is an ID for a storage system. Pool Manager 102 defines a Storage system ID. Storage system name 402 corresponds to the storage system ID 401. Storage system name 402 is provided for ease in system management, and may be user selected. Vender name 403 identifies the manufacturer of the storage system. Product name 404 is a product name of the storage system. Serial number 405 is a serial number for the storage system (e.g., manufacturer's serial number). Cascade 406 is a flag indicating if the storage system is an external storage system. Cascade 0 identifies the storage system as a local storage system. Cascade 1 identifies the storage system as being connected to the local storage system. Cascade 2 identifies the storage system as being connected to a cascade 1 storage system. Pool Manager 102 assigns cascade 406. A cascade 3 identifies the storage system as being connected to a cascade 2 storage system. Cascade 406 may be used to determine access rate rank 804.

As with each table described herein, FIG. 3 is exemplary and more or less information may be contained therein and not depart from the spirit and scope of the present invention. Information of 403–405, maintained in storage information 130 is provided by the storage vender and/or manufacturer. If the information is not available, the Pool Manager 102 or a user can define the information. For example, the Pool Manager 102 may define default names and numbers such as vendor_X, vendor_Y, vendor_Z, product_A, product_B, product_C, 001, 002 and 003, to identify the storage systems.

FIG. 4 illustrates a table maintaining information about the physical storage devises (e.g., disks) which are used in storage systems 107, 108, and 109. The device ID 502 identifies each physical storage device, each preferably being a physical disk drive. Storage system ID identifies the storage system where each physical storage device is installed. Interface 503 is a protocol name that each corresponding physical disk supports. Vender name 504 is the name of the manufacturer of the physical disk (or other storage device). Model name 505 is a model name for the physical disk. Buffer 506 is an amount of buffer installed into the physical disk.

Rotational speed 507 is the rotational speed of the physical disk, which is specified, for example, in units of revolutions per minute. Capacity 508 is the size of physical disk. Internal data transfer rate 509 is a transfer rate of the physical disk, which may, in most cases, be calculated by the rotational speed×the recoding density. Average of seek time 510 is an average seek time of the physical disk. Number of disks 511 is a number of disks in the disk drives (or other media in the storage device).

The set of information 503–511 defines a set of attributes that apply to each device ID 502. The collected physical disk information is used to populate the physical disk table and the information is accessed and managed by the pair of storage system ID 401 and device ID 502. As mentioned above, the physical disk information is written in acknowledge signals responding to "Identify Device" commands or "Inquiry" commands. If there is information that is not defined in ATA or SCSI protocols, such information is written in a vendor unique field of the acknowledge signals. A user can also provide or define the information of 503–512 (e.g., via a GUI interface). Total capacity 512 is a total capacity of each physical storage device identified by device ID.

FIG. 5 shows configuration of RAID groups in the storage system 107, 108, and 109. RAID group field 601 contains an ID for a RAID group. Number of physical disk 602 is the number of physical disks in a corresponding RAID group. Number of LDEV 603 is the number of logical devices in the RAID group. Used space 604 is the amount of used space of the RAID group. RAID level 605 is the RAID level of the RAID group. Free space 606 represents the amount of free space of the RAID group. This information is collected by controllers 110 (e.g. 110a, 110b, and 110c) from storage information 130 and/or retrieved/calculated from other data in the acknowledge responses.

FIG. 6 illustrates the configuration of logical devices (LDEV). LDEV ID 701 is an ID for a LDEV. Capacity 702 is an amount of capacity of a corresponding LDEV. Port 703 is a port name that the corresponding LDEV is mapped to. The field in use 704 is a flag indicating if the logical device has already been assigned to a pool or other task and is used by the Provisioning Manager 104, for example, to determine if it can assign the LDEV to a pool (e.g., a pool of journal type ID 901). Used space 705 represents an amount of capacity currently being used by the corresponding LDEV. Pool ID 801 is used to identify a storage pool to which the corresponding LDEV is assigned. Pool Manager 102 assigns the unique pool ID 801 to the corresponding LDEV device ID (LDEV ID 710). Pool Manger 102 gets information of 701–705 from storage information 130 via controller 110a and populates the LDEV configuration table (FIG. 6).

In one embodiment, three types of journals are defined, "normal after journal", "before journal" and "mirrored after journal." "normal after journal" records writing from host 101 for backup/recovery. Hereupon controller 110a takes a snap shot for backup/recovery. "Normal after journal" also records writing from host 101 for remote copy. "Before journal" is taken during quick recovery for "undo." "Mirrored after journal" is a copy of the "normal after journal".

Figure 21:
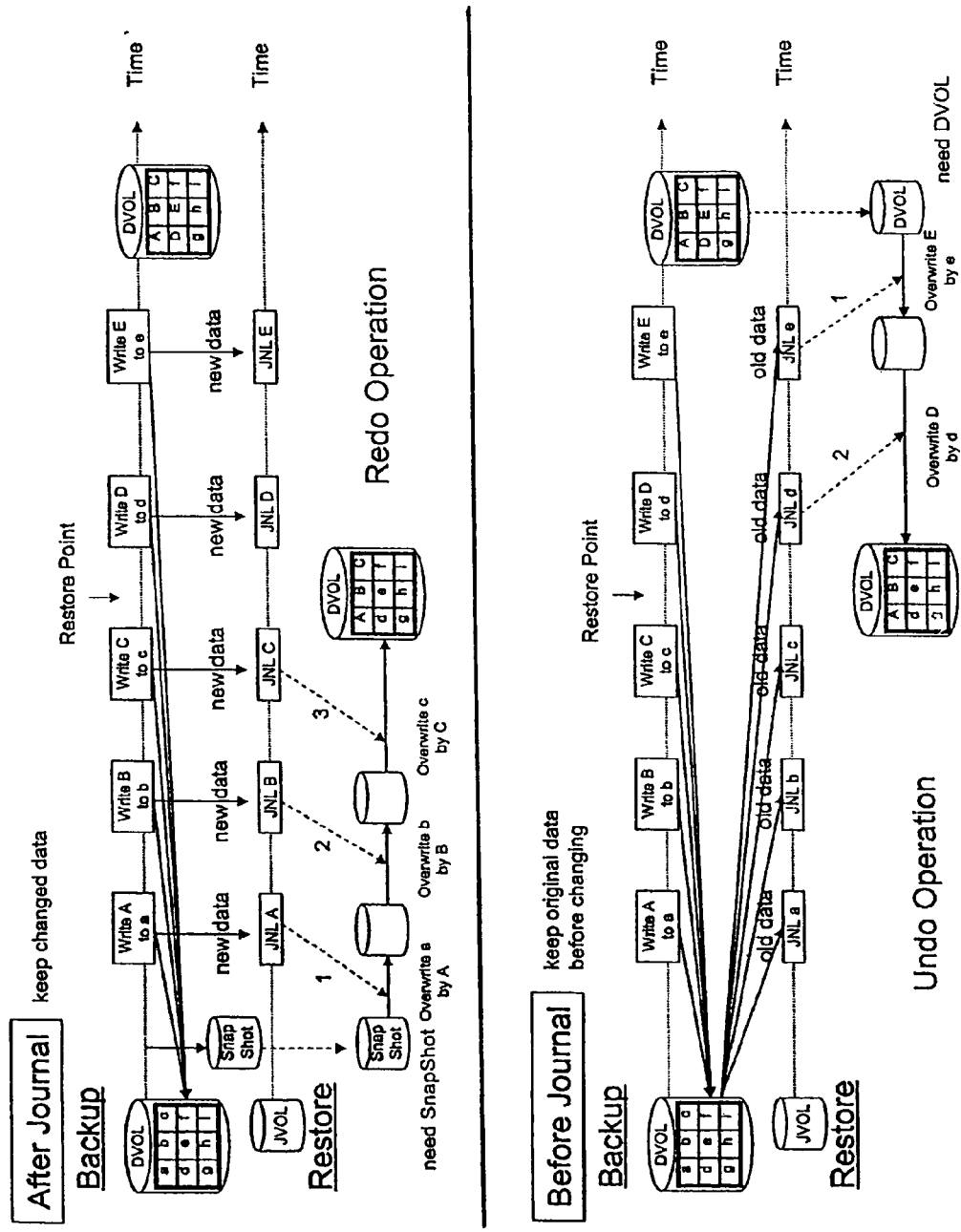
FIG. 21 a drawing illustrating basic operations of a type of "normal after journal," and a type of "before journal" process that are applicable to several embodiment of the present invention.

Basic operations of a type of "normal after journal," and a type of "before journal" are illustrated in FIG. 21. Depending on structure or operation of a journal, certain performance preferences, or needs, are associated with the storage pool used for the journal. For example, a storage pool for "normal after journal" needs large storage capacity in particular because all writing is saved in this pool by controller 110a. A storage pool for "before journal" needs a combination of a fast access rate and reliability because "before journal" is used for backup/recovery. The fast access rate is needed to perform the backup/recovery quickly. The storage pool for "before journal" is not allowed to delete before journal data because it is needed to recover the data. Therefore, the storage pool for "before journal" needs reliability. A storage pool for "Mirrored after journal" also needs a large storage capacity.

FIG. 8 illustrates a table of journal information 111 of journals that primary storage system 107 manages. The journal information identifies and/or describes characteristics, such as performance preferences, of the managed journals. For example, journal type ID 901 is an ID for identifying a journal type of the journal types managed. A storage pool which has a particular journal type ID 901 is a storage pool for the type of journal identified by the particular journal type ID. Controller 110a takes journal to an appropriate storage pool for journal type ID. Controller 110 saves data for a journal to a storage pool assigned to the journal, the assigned storage pool having appropriate performance attributes that best satisfy the performance preferences for the journal type with consideration given to other journal types.

Continuing now with the journal information table of FIG. 8, journal name 902 is a name of the journal. Priority 903 is a priority of the journal, which is used in assigning storage resources. In this embodiment, priority "1" is the highest priority.

Capacity 904 is a performance preference that indicates a preferable relative amount of storage space used to store the journal. Reliability 905 is a performance preference that indicates a preferable degree of reliability of storage used to store the journal. And, access rate 906 is a performance preference that indicates a preferable relative access rate of storage used to store the journal.

In Capacity 904, reliability 905 and access rate 906, are, in one embodiment, identified using the following five levels: "very high", "high", "moderate", "low", and "very low." Appropriate pools are assigned to hold journal data based on the levels. In other embodiments, instead of relative, or degrees, of performance, specific values or a range of values are indicated (e.g. not less than a specified access rate, or not less than a specific capacity, etc.).

FIG. 7 is a table illustrating the configuration of a number of storage pools. Control items over the storage pool are pool ID 801, device ID 502, capacity rank 802, reliability rank 803, access rate rank 804, writable flag 805, and enable flag 806. Pool ID is associated with device ID. Writable flag 805 is used to determine if the pool is available for storing journal data. In this embodiment, if writable flag 805 is set at "1", the corresponding pool is available for storing journal data, and if "0", it is not available. Usually "1" is set. This flag is checked, for example, before assigning LDEVs from the pool or writing journal data. Enable flag 806 is used to indicate that the corresponding pool is valid/invalid. Enable flag "0" indicates invalid, and enable flag "1" indicates valid. The pool with enable flag "0" is neglected in assignment of logical devices (LDEVs) for journal data.

A storage pool is configured in the following way by pool manager 102:

1. Assign a unique pool ID 801 to a corresponding device ID. The pool ID is used to identify a storage pool.

2. Determine a rank of capacity 802 for each pool M. This rank is determined, for example, based on total capacity 512 of each device ID 502 in FIG. 4.

3. Determine a rank of reliability 803 for each pool ID. This rank is determined, for example, based on the interface type of the pool (e.g., different interfaces have different reliability, e.g., SCSI is more reliable than ATA). As shown in FIG. 11, interface rank is set such that higher rank is assigned in the order of SAS, SCCI and ATA. Within the same protocol, higher rank may be assigned, for example, in the order of data transfer rate. A higher rank within the reliability rank 803 is assigned to the pool that has an interface with a higher interface rank compared to other pools.

4. A rank of access rate 804 is determined based on, for example, the following performance attributes in the following order: internal data transfer rate 509 in FIG. 4, data transfer rate 1202 in FIG. 11, average seek time 510 in FIG. 4, rotational speed 507 in FIG. 4 and buffer size 506 in FIG. 4. In this way, FIG. 7 is made up. However, in other embodiments a different set of performance attributes may be utilized. A transfer rate of the pool interface is factored into the access rate rank.

Journal group 115 is a set of data volumes 114. Updates to the data volumes 114 in the same journal group are stored in the journal volumes. As shown in FIG. 9, a journal group is managed together with the corresponding type of journal. Journal group ID 1001 is a unique ID assigned to each journal group and is used to identify a particular journal group. Various types of journals may be created by controller 110a from each journal group. For example, in one embodiment, three types of journals are created: "normal after normal," "before journal," and "mirrored after journal." The Provisioning Manger 104 creates a journal group table such as that illustrated in FIG. 9 by using, for example, journal type ID of FIG. 8 and other information. For example, in one embodiment, creation of FIG. 9 is an initial step (e.g., see step 1401) in a method that assigns LDEVs to one or more journal groups.

If automatic increased capacity mode 1002 is on, capacity of the storage pool for the corresponding journal type is increased automatically by executing the process of FIG. 14 when used capacity 1004 (705 of each disk drive in the corresponding journal type) is over the threshold for automatic increased capacity 1004. A user can define the threshold for automatic increased capacity 1004 as remaining capacity (e.g., Giga Bytes (GB) or a percentage of used/free capacity).

A user may specify automatic increased capacity mode 1002, capacity of increased capacity 1003, and threshold for automatic increased capacity 1004 when a journal group is created. In one embodiment, a default of automatic increased capacity mode 1003 is off. Pool Manager 102 periodically updates FIG. 6 and monitors the used space 705 for automatic increased capacity mode.

Provisioning Manager 104 determines a rank of the storage pools to assign LDEVs to the journal type. For example, the Provisioning Manager 104 is configured to:

1. Select a journal type ID with highest priority in the table shown in FIG. 8. In this example, Journal type ID 1 is selected first in FIG. 8.

2. Select the highest-ranked item among capacity 904, reliability 905, and access rate 906 for the selected journal type ID based on the table in FIG. 8. For example, capacity 904, reliability 905, and access rate 906 of Journal type ID 1 are "low", "high" and "very high," so the highest-ranked item is access rate. In the case where capacity 904, reliability 905, and access rate 906 are the same in rank, the first priority is reliability 905, the second priority is access rate, and the third priority is capacity 904.

3. Determine order of pool ID 1101 in FIG. 10 for the selected journal type ID. In the case where the selected journal type ID is "0", the selected highest-ranked item is capacity 904, and storage pools are assigned to the selected journal type ID in the order of descending ranks in capacity 904 in the table shown in FIG. 7 (in the order of pool IDs 1, 2, 3, 0). The order of pool ID identifies the order of using storage pools for the selected journal type ID. In the case that the selected journal type ID is "0", storage pool ID 1 is first used. If the assigned area (writable 805, in use 704) of storage pool ID 1 is occupied, then storage pool ID 2 is second used. If the assigned area (writable 805, in use 704) of storage pool ID 2 is occupied, then storage pool ID 3 is third to be used. If the assigned area (writable/in use) of storage pool ID 3 is occupied, then storage pool ID 0 is fourth used, and so on as applicable to the number of available pools.

4. Select a journal type ID with second highest priority in the table shown in FIG. 8.

In this way, the provisioning manager populates a journal type ID/order of pool ID table as shown in FIG. 10. Based on information contained in the tables of FIGS. 9 and 10, provisioning manager 104 can determine to which storage pool each journal group should be assigned. This allocation can be performed manually displaying the tables in FIGS. 7–9, on for example, a GUI of the provisioning manager 104 and providing a selection tool for the user.

The order of pool ID 1101 is an order for each journal type that Controller 110*a* assigns storage pools to journals of a corresponding journal type. For example, in FIG. 10, order of pool ID of journal type ID 0 is 1, 2, 3 and 0. Therefore, Controller 110*a* stores journals to one or more storage pools of pool ID=to start. If all storage pools of pool ID=1 are full, Controller 110*a* then continues by storing the journals to one or more storage pools of pool ID=2. And so on, if all storage pools of pool ID=2 are full, Controller 10*a* then stores the journals to one or more storage pools of pool ID=3.

FIG. 14 shows a method of LDEV assignment to storage pool of each journal type ID 901.

A user specifies a journal group ID 1001 with parameters (port, capacity of storage pool, automatic increased capacity mode, capacity of increased capacity and threshold for automatic increased capacity) by using Provisioning Manager 104. Alternatively, the parameters may be provided to the Provisioning Manager in a text file, Optical Character Recognition (OCR), scanned in via one or more bar codes, RFID chip or other data entry techniques.

Step 1401: Provisioning Manager 104 creates FIG. 9 for the specified journal group.

Step 1402: Provisioning Manager 104 retrieves the configuration of LDEV(s) from FIG. 6, list of priority 903 corresponding to the journal type IDs 901 from FIG. 8, and the table that relates each journal type ID to an order of pool IDs from FIG. 10.

Step 1408: Provisioning Manager 104 sets the journal type ID N to the highest priority journal type.

Step 1409: Provisioning Manager 104 sets the pool ID R to the first pool ID for Journal type R. This and subsequent settings of the pool ID are taken according to the order of pool ID for the journal type ID R.

Step 1403: Provisioning Manager 104 checks whether there is a LDEV of the Rth pool ID not in use for Nth journal type ID. If the LDEV does not exist, go to step 1407. If the LDEV exists, go to step 1404.

Step 1404: Provisioning Manager 104 assigns one LDEV and its specified port to the Nth journal type ID from the Rth pool ID. Then, Provisioning Manager 104 saves this information to FIG. 9 (e.g., LDEV ID 701, port 703, capacity 702 and pool ID 801) and FIG. 6 (e.g., changing in use 704 to yes).

Step 1405: Provisioning Manager 104 checks whether the Nth journal type ID has the required capacity based on currently assigned LDEVs. If the required capacity is not yet met, go to step 1403. If the required capacity has not been met, go to Step 1406.

Step 1406: Provisioning Manager 104 checks whether all journal type IDs have been assigned their capacities based on all currently assigned LDEVs. If the required capacities have not been met, go to Step 1411. If the required capacities have been met, go to END.

Step 1407: Provisioning Manager 104 checks whether there are any pools that have an LDEV that is assignable to Nth journal type ID. If no LDEVs are available, go to END. If so, go to step 1410.

Step 1410: Provisioning Manager 104 sets the pool ID R to the next Pool ID in order of Pool ID for the current journal type ID N.

Step 1411: Provisioning Manager 104 sets the journal type ID to the next highest priority journal type.

For example, a user specifies: journal group ID 1001 as 0, 3840 GB as capacity of journal type ID=0, 200 GB as capacity of journal type ID=1, 2880 GB as capacity of journal type ID=2, automatic increased capacity mode 1002 of journal type IDs=0 and 2 as on, capacity of increased capacity 1003 for journal type IDs 0 and 2 as 960 GB, threshold for automatic increased capacity 1004 for journal type ID=0 as 800 GB for remaining capacity, threshold for automatic increased capacity 1004 for journal type ID=2 as 70% in use. And, at step 1401, Provisioning Manager 104 creates FIG. 9 for the journal group ID=0.

At step 1402, Provisioning Manager 104 gets information from FIGS. 10, 8 and 6.

At step 1408, Provisioning Manager 104 sets N to 1.

At step 1409, Provisioning Manager 104 sets R to 0.

According to the data from FIG. 10, the order that Provisioning Manager 104 selects LDEVs from pool ID 801 for journal type ID=1 is pool ID=0, 2, 3, 1. In accordance therewith, at step 1409, the pool ID is initially set to 0, and Provisioning Manager 104 will initially proceed to select LDEVs from pool ID=0 for journal type ID=1.

At step 1403, it is determined that LDEV 00:00 of pool ID=0 is not used, and is therefore available to be assigned to the current journal type ID.

At step 1404, Provisioning Manager 104 assigns port CL1-A to LDEV 00:00 retrieves port assigned or assigned. Then, Provisioning Manager 104 saves this information (journal group ID=0, journal type ID=1, LDEV ID=00:00, Port=CL1-A, Capacity=100 GB, pool ID=0) to FIG. 9. Provisioning Manager 104 also provides the LDEV ID and corresponding Port to FIG. 6, and sets the in use flag to yes.

At step 1405, it is noted that the Capacity of journal type ID=1 is 100 GB. However, the Capacity requirement for journal type ID=1 is 200 GB. Hence, capacity of journal type ID=1 does not satisfy the required capacity.

Returning to step 1403, the Provisioning Manager 104 assigns LDEV 00:01 as well as LDEV 00:00 to the current journal ID type. Again, at step 1405, capacity of journal type ID=1 is noted, and it now satisfies the required capacity.

At step 1406, it is noted that journal type IDs=0 and 2 have not yet had their required capacities assigned. Therefore, at step 1411, the journal type ID N is set to the next highest priority journal type ID, and the method is repeated until all journal type IDs have been assigned at least the required capacity.

Accordingly, LDEVs are assigned to journal type ID=0, 2 by Provisioning Manager 104 as well as journal type ID=1. FIGS. 15 and 16 are created by this method or by a derivation of this method.

Tables illustrated in FIG. 3 to FIG. 11 should are preferably stored on memory 112, in management database 103, or another suitable storage location. The format of the tables may be changed, and all data contained in the tables may, for example, be stored in a single relational database or multi level spreadsheet.

FIG. 12 illustrates another embodiment of the present invention. A storage system in FIG. 12 includes, for example, all elements that are illustrated in the storage system in FIG. 1. The storage system in FIG. 12 further includes a cache pool 122. Cache pool 122 temporally stores journal data until the data is transmitted to the designated journal volume.

Cache pool 122 may be set by a user via the provisioning manager 104. Alternatively, a storage pool may be automatically selected and set as the cache pool. In one embodiment, the cache pool is selected from the pool with the highest-ranked access rate 804 that also corresponds to a device ID 502 whose cascade 406 is "0." Cache pool 122 needs a fast access rate, therefore provisioning manager 104 selects pools with cascade 0. If there are no storage pools which have cascade 0, Provisioning Manager 104 may be configured to not create cache pool 122.

Figure 13:
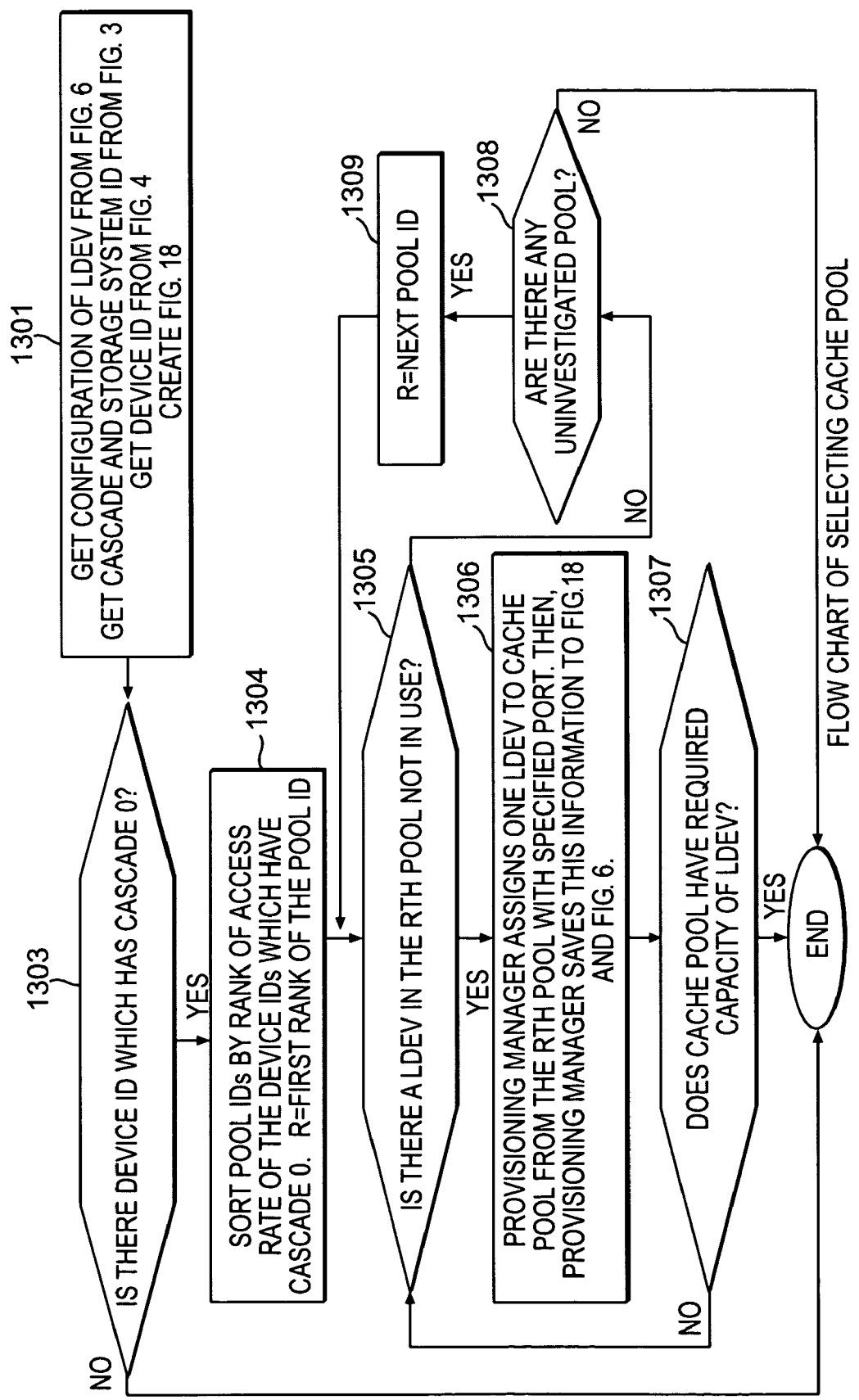
FIG. 13 is a flow chart illustrating a process to set a cache pool according to an embodiment of the present invention.

FIG. 13 is a flow chart that illustrates one method to set the cache pool 122. Preliminary, a user specifies a capacity of cache pool 122, threshold for destaging timing, and a port 703 by using Provisioning Manager 104.

Step 1301: Provisioning Manager 104 retrieves the configuration of LDEVs from FIG. 6, cascade and storage system ID from FIG. 3, device ID from FIG. 4, and creates a cache pool table (e.g., see FIG. 18).

Step 1303: the Provisioning Manager 104 checks whether there are any device IDs which have a cascade of 0. If no device IDs with cascade 0 are available, the method exists (go to end.

Step 1304: the Provisioning Manager 104 sorts pool IDs by rank of access rate of the device IDs which have cascade 0. Provisioning Manager 104 sets R to the highest ranking pool ID.

At Step 1305: the Provisioning Manager 104 checks whether there is a LDEV of the Rth pool ID that is not in use. If all LDEVs of the Rth pool ID are in use exist, go to step 1308. If the LDEV exists, go to step 1306.

Step 1306: the Provisioning Manager 104 assigns one LDEV to cache pool 122 from the Rth pool ID with the LDEV's specified port (a port assigned by the Provisioning Manager and/or user). Then, Provisioning Manager 104 saves this information to FIGS. 18 and 6.

Step 1307: the Provisioning Manager 104 checks whether cache pool 122 has required capacity from the currently assigned LDEV/LDEVs. If the required cache pool capacity has not been met, go to Step 1305. If the required cache pool capacity has been met, the method exists (go to END).

At Step 1308: the Provisioning Manager 104 checks whether there are any pool IDs that have LDEVs available to be assigned to the cache pool. If no LDEVs are available, the method exists (go to END). If one or more LDEVs are available then go to Step 1309.

At Step 1309: the Provisioning Manager 104 sets R to the next highest priority pool ID, and, moving to step 1305 the process repeats for each applicable pool ID in order of priority.

For example, a user specifies capacity (100 GB) of cache pool 122, threshold destaging timing (80 GB in use), and port 703 (CL1-B) by using the Provisioning Manager 104. At step 1301, Provisioning Manager 104 creates FIG. 18, setting capacity port, and destaging timing (80 GB in use) according to the user's specifications.

At Step 1303, there is device ID which has cascade O. Therefore, go to Step 1304.

At Step 1304, Provisioning Manager sets 0 to R. At Step 1305, there is a LDEV not in use. Therefore, go to Step 1306.

At Step 1306, Provisioning Manager sets port=CL1-B and in use=Yes to LDEV 00:02 in FIG. 6, and LDEV (ID=00:02, port=CL1-B, capacity=100 GB, pool ID=0) to FIG. 18.

AT Step 1307, cache pool has acquired specified capacity. Therefore, the method is complete (go to END). Pool Manager 102 periodically updates FIG. 6 and monitors the used space 705 for destaging timing. Capacity of cache pool 122 and a threshold for destaging timing are, for example, set through provisioning manager 104 (e.g., provisioning manager GUI). The threshold may be an amount of journal data stored in the cache pool or an occupation ratio that journal data occupies in the cache pool. If journal data stored in cache pool exceeds the threshold, the journal data is transmitted to the designated journal volume. Alternatively the journal data may be transferred at times of low data throughput, if any. Since cache pool 122 is a pool with the highest-ranked access rate, cache pool enables a reduced response time to host 101. Also, it enables high-speed restore.

Although the present invention has beeri described herein mainly with reference to a specific set of example tables, the devices and processes of the present invention may be applied using other tables containing similar information and the processes may be performed differently than specifically recited herein.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a disk drive, or disk, it should be understood that any storage device of any media (tape drives, magnetic media, RAM, optical, magnetic, or electronic data, etc.) may be applied to the processes described herein. Furthermore, the inventor recognizes that newly developed technologies not now known may also be substituted for the described parts and still not depart from the scope of the present invention. All other described items, including, but not limited to storage devices, hosts, interfaces, storage systems, tables, databases, etc should also be consider in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user (e.g. Provisioning Manager GUI) or other mechanism utilizing the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, retrieving table data, updating tables, inquiring disk drives and storage systems, checking capacities, performance and status, assigning storage media to pools, assigning pools to journals, and the display, storage, or communication of data and/or results according to the processes of the present invention.

The present invention may suitably comprise, consist of, or consist essentially of, any of element of the various parts or features of the invention as described herein and their equivalents. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method of allocating storage space to a series of processes, comprising the steps of:
    determining a process N comprising the highest priority of the series of processes among a predetermined priority of the processes;
    selecting a storage pool R comprising a highest ranking storage pool among a plurality of storage pools for the process N, said storage pools being ranked according to capacity, reliability, and an access rate;
    assigning any available devices from the storage pool R up until an amount of storage space in the assigned available devices meets or exceeds a required storage capacity of the process N, said storage capacity including capacity, reliability, and an access rate;
    if the available devices from the storage pool R do not meet the required storage capacity of the process N, then substituting the storage pool R with the next highest ranking storage pool among the plurality of storage pools for the process N and repeating the steps of selecting and assigning until the required storage capacity of the process N is met.

2. The method according to claim 1, wherein the method further comprises the steps of:
    2-1) substituting the process N with a next highest priority of the series of processes;
    2-2) repeating the steps of selecting, assigning, and substituting R, until a required storage capacity of the next highest priority process has been assigned; and
    2-3) repeating the steps of 2-1) substituting, and 2-2) repeating until the required capacities for each of the processes have been assigned.

3. The method according to claim 1, wherein the series of processes comprise journal types.

4. The method according to claim 3, wherein the journal types comprise normal after journal, a before journal, and a mirrored journal.

5. The method according to claim 1, wherein the processes comprise journal types of a journal group, maintained in an interconnected storage system, and the storage pools comprise a series of logical devices throughout the interconnected storage system.

6. The method according to claim 1, wherein the storage pools are ranked relative to each process, based on the storage pools ability to meet performance preferences of the process type.

7. The method according to claim 1, wherein the access rate comprises a ranking based on an interface used by the storage pool.

8. The method according to claim 7, wherein the ranking based on interface is ranked in the order of a data transfer rate of the interface.

9. The method according to claim 7, wherein the ranking based on interface comprises an interface order of SAS v1, Ultra320 SCSI, Ultra160 SCSI, Serial ATA/6000, Serial ATA/3000, Serial ATA 1500, and Ultra ATA/133.

10. The method according to claim 1, wherein each storage pool comprises a set of storage devices having similar performance attributes.

11. The method according to claim 10, wherein the storage pools are derived from storage devices in an interconnected multi-storage system having different types of storage devices.

12. The method according to claim 1, wherein:
    said method is embodied in a set of computer instructions stored on a computer readable media;
    said computer instructions, when loaded into a computer, cause the computer to perform the steps of said method.

13. The method according to claim 12, wherein said computer instruction are compiled computer instructions stored as an executable program on said computer readable media.

14. The method according to claim 11, wherein said method is embodied in a set of computer readable instructions stored in an electronic signal.

15. A system, comprising:
    a provisioning manager configured to allocate resources of a set of storage systems to a plurality of journals maintained in the storage systems;
    wherein the provisioning manager utilizes performance attributes of each of the storage systems, a predetermined priority among the plurality of journals, and performance priorities of each of the journals to determine the allocation of resources among the plurality of journals, and
    said performance attributes of each of the storage systems and said performance priorities of each of the journals include capacity, reliability, and an access rate.

16. The system according to claim 15, wherein:
    the system comprises a set of storage devices comprising different storage device types; and
    the resources comprise a set of storage pools comprising at least one storage pool for each type of storage device in the storage systems.

17. The system according to claim 15, wherein:
    each of the storage systems comprises at least one storage device;
    the storage devices comprising different storage device types; and
    the system further comprises a pool management device configured to send inquiries to each of the storage systems so as to identify each of the storage devices, and to group the storage devices into storage pools according to a respective storage device type thereof; and the provisioning manager utilizes performance attributes of the storage devices in the storage pools and performance priorities of the journals to determine the allocation of resources among the plurality of journals.

18. The system according to claim 17, wherein the plurality of journals comprise at least two journal types each having different performance priorities.

19. The system according to claim 17, wherein the plurality of journals comprise at least two journal types, and the performance priorities comprise performance priorities of each of said journal types.

20. The system according to claim 19, wherein the journals comprise data recovery journals comprising at least one of a normal after journal, a before journal, and a mirrored journal.

21. The system according to claim 17, wherein the provisioning manager allocates the highest performing available storage pool for a particular performance attribute to a journal having the highest performance priority for a corresponding attribute.

22. The system according to claim 15, wherein the provisioning manager allocates a set of storage pools having the highest performance in a specified performance attribute to fulfill storage requirements of a journal having the highest performance priority corresponding to the specified performance attribute.

23. The system according to claim 22, wherein:
each of the storage pools comprises at least one logical device;
the provisioning manager is configured to sort the storage pools by an access rate, determine the highest ranking access rate storage pool having an available logical device, and assign the available logical device to a journal type with a high access rate performance priority.

24. The system according to claim 17, wherein the provisioning manager and the pool management device operate from a host device, and the storage systems comprise an interconnected storage system comprising a primary storage system coupled to the host and at least one secondary storage system.

25. The system according to claim 24, wherein said at least one of the secondary storage systems is cascaded with the primary storage system.

26. The system according to claim 24, wherein one of said at least one of the secondary storage systems is cascaded with another one of said secondary storage systems.

27. The system according to claim 26, wherein the cascaded secondary storage systems are not allocated to journals with the highest access rate performance priorities.

28. The system according to claim 26, further comprising a cache allocation device configured to allocate a journal cache from at least one logical device of the storage systems;
wherein the cascaded secondary storage systems are not allocated to the journal cache.

29. A system for allocating resources of a set of storage systems each having at least one storage device, comprising:
memory stored with storage device configuration information for each storage device in the storage systems, storage device specification information for each storage device in the storage systems, logical device information for each logical device in the storage systems, ranking information for each logical device in the storage systems, and journal information for journals maintained in the storage systems; and
a provisioning manager configured to utilize the storage device specification and the storage device configuration information, the logical device information, the ranking information, and the journal information to determine the allocation of resources among the plurality of journals,
wherein the allocation matches performance attributes of each of the storage systems to performance priorities of each of the journals, and
said performance attributes of each of the storage systems and said performance priorities of each of the journals include capacity, reliability, and an access rate.

30. The system according to claim 29, wherein the attributes of each disk drive includes capacity, a data transfer rate, and reliability.

31. The system according to claim 29, wherein the storage device information comprises a buffer size, a rotational speed, a capacity per disk, a internal data transfer rate, a seek time, and a number of disks.

32. The method according to claim 1, wherein the highest priority is determined based upon an access speed, and the highest priority process is a journal cache.

* * * * *